US012247590B2

(12) United States Patent
Altenberger et al.

(10) Patent No.: US 12,247,590 B2
(45) Date of Patent: Mar. 11, 2025

(54) HYDRAULIC SYSTEM WITH A SWITCH VALVE BLOCK FOR A HYDRAULICALLY ACTUATABLE WORKING MACHINE

(71) Applicants: LIEBHERR-WERK BISCHOFSHOFEN GMBH, Bischofshofen (AT); DANFOSS SCOTLAND LTD., Edinburgh (GB)

(72) Inventors: Florian Altenberger, Taxenbach (AT); Josef Huttegger, Grossarl (AT); Mario Hettegger, Grossarl (AT); Christoph Kiegerl, Werfenweng (AT); Alexis Dole, Midlothian (GB)

(73) Assignees: LIEBHERR-WERK BISCHOFSHOFEN GMBH, Bischofshofen (AT); DANFOSS SCOTLAND LTD., Edinburgh (GB)

( * ) Notice: Subject to any disclaimer, the term of this patent is extended or adjusted under 35 U.S.C. 154(b) by 47 days.

(21) Appl. No.: 17/782,221

(22) PCT Filed: Dec. 3, 2020

(86) PCT No.: PCT/EP2020/084525
§ 371 (c)(1),
(2) Date: Jun. 3, 2022

(87) PCT Pub. No.: WO2021/110866
PCT Pub. Date: Jun. 10, 2021

(65) Prior Publication Data

US 2023/0009724 A1 Jan. 12, 2023

(30) Foreign Application Priority Data

Dec. 3, 2019 (DE) ..................... 10 2019 132 884.5

(51) Int. Cl.
*F15B 11/17* (2006.01)

(52) U.S. Cl.
CPC ..... *F15B 11/17* (2013.01); *F15B 2211/20576* (2013.01); *F15B 2211/30505* (2013.01);
(Continued)

(58) Field of Classification Search
CPC ............ F15B 2211/781; F15B 2211/87; F15B 2211/41518; F15B 11/17
See application file for complete search history.

(56) References Cited

U.S. PATENT DOCUMENTS 4,561,249 A * 12/1985 Watanabe ............. E02F 9/2292 60/429
9,885,374 B2 2/2018 Christensen
2015/0135697 A1* 5/2015 Shimizu ................ E02F 9/2296 60/426

FOREIGN PATENT DOCUMENTS

DE 102008008102 A1 * 8/2009 ............ F15B 11/163
DE 102012101847 A1 9/2013
(Continued)

*Primary Examiner* — Abiy Teka
(74) *Attorney, Agent, or Firm* — Dilworth & Barrese, LLP.; Michael J. Musella, Esq.

(57) ABSTRACT

The present invention relates to a hydraulic system for a hydraulically actuable work machine that comprises a switching valve block having a plurality of valve block inputs for a respective connection to a pressure output of one or more hydraulic fluid pumps; having a plurality of valve block outputs for outputting a pressurized hydraulic fluid; and having at least one valve that is arranged between valve block inputs and valve block outputs and that is adapted to selectively produce a fluid connection between a first valve block input and a first valve block output or between the first valve block input and a second valve block output; a plurality of pressure sources, preferably a plurality of separately controllable pressure sources of which each one is connected to a respective valve block input; and a plurality of hydraulic consumers of which each one is connected to a
(Continued)

respective valve block output. The system is characterized in that the first valve block output furthermore already has a fixed fluid connection, preferably a fixed exclusive fluid connection, to a second valve block input and in that the steering is connected to the first valve block output.

22 Claims, 3 Drawing Sheets

(52) U.S. Cl.
CPC ............... *F15B 2211/41518* (2013.01); *F15B 2211/426* (2013.01); *F15B 2211/6309* (2013.01); *F15B 2211/6313* (2013.01); *F15B 2211/6652* (2013.01); *F15B 2211/6654* (2013.01); *F15B 2211/7142* (2013.01); *F15B 2211/781* (2013.01); *F15B 2211/8626* (2013.01); *F15B 2211/8633* (2013.01); *F15B 2211/8757* (2013.01)

(56) References Cited

FOREIGN PATENT DOCUMENTS

| | | | |
|---|---|---|---|
| DE | 112013003540 | B4 | 4/2015 |
| DE | 102017005479 | A1 | 12/2018 |
| JP | H11-181842 | A | 7/1999 |
| JP | 2004-150115 | A | 5/2004 |
| WO | 2008/009950 | A1 | 1/2008 |
| WO | 2014/097423 | A1 | 6/2014 |

* cited by examiner

HYDRAULIC SYSTEM WITH A SWITCH VALVE BLOCK FOR A HYDRAULICALLY ACTUATABLE WORKING MACHINE

BACKGROUND OF THE INVENTION

The present invention relates to a hydraulic system having a switching valve block for a hydraulically actuable work machine.

Work machines typically have a plurality of hydraulic consumers, for example a hydraulic steering or a hydraulic lifting cylinder or tilt cylinder for raising or tilting a load.

If these different hydraulic consumers are actuated by a common hydraulic fluid pump, the highest pressure demanded by the hydraulic consumers must be provided by the pump. This has the result that fluid is supplied to a consumer at a very high pressure under certain circumstances even though this consumer does not actually require such a high pressure and this only takes place because the other consumer currently requires a very high fluid pressure for the performance of its movement. This results in considerable losses that reduce the efficiency of such a work machine.

Due to the above-discussed facts, it is known from the prior art to bundle a plurality of pressure sources of small dimensions via a switching valve block in dependence on the requirement of a hydraulic consumer so that hydraulic consumers having a small power requirement receive a smaller power and hydraulic consumers having a greater power requirement receive a greater power.

WO 2008/009950 A1 shows the implementation of such a concept.

It is disadvantageous here that the response time on the start-up of a hydraulic consumer increases considerably, which negatively influences the handling and the operability of such a work machine. It is finally necessary that now the individual smaller pressure sources are combined to one another via valves to actuate the hydraulic consumer.

In the ongoing operation of the machine, a vehicle control device senses and determines the oil requirement (or hydraulic fluid requirement) of every hydraulic work function in dependence on the driver specification (e.g. a control joystick). The vehicle control decides on the switching of inputs and outputs in the switching valve block or on the actuation/adjustment of the valves contained ("switch position") in dependence on this requirement. The required oil amount is set as a result depending on the work function.

This continuously changing distribution/association of the oil delivery rate to the different hydraulic consumers (such as work functions or steering functions) during machine operation is extremely challenging. It requires very complex algorithms and fast and precisely switching valve technology to ensure operator comfort, which causes a relatively cost-intensive implementation since such valve technology is not available in economic batch sizes on the market.

SUMMARY OF THE INVENTION

It is the object of the present invention to achieve the functional safety with a simultaneous alleviating or solving of the above-stated problems. This is done using a hydraulic system that has all the features herein. Further advantageous embodiments are described herein.

The hydraulic system in accordance with the invention for a hydraulically actuable work machine comprises a switching valve block having a plurality of valve block inputs for a respective connection to a pressure output of one or more hydraulic fluid pumps, having a plurality of valve block outputs for discharging a pressurized hydraulic fluid, and having at least one valve that is arranged between valve block inputs and valve block outputs and is adapted to selectively produce fluid communication between a first valve block input and a first valve block output or between the first valve block input and a second valve block output. The hydraulic system further comprises a plurality of pressure sources, preferably a plurality of separately controllable pressure sources, of which a plurality, but not necessarily all, are connected to a respective valve block input, and a plurality of hydraulic consumers of which each one is connected to a respective valve block output. The hydraulic system is characterized in that the first valve block output furthermore already has a fixed fluid connection, preferably a fixed exclusive fluid connection, to a second valve block input and in that the steering is connected to the first valve block output.

Since it is now possible in accordance with the present invention that two different pressure sources can be used for the actuation of the steering, the latter can also still be supplied with pressurized fluid on a failure of one of the pressure sources and a corresponding position of the valve.

Provision can furthermore be made in accordance with the invention that the at least one valve is a switching valve that exclusively connects one valve block input to one of the plurality of valve block outputs. The switching valve accordingly connects the valve block input to one of the plurality of valve block outputs, but can also switch the valve block input to at least one other valve block output in a different switch position.

Provision can be made in accordance with an optional further development of the invention that the plurality of pressure sources are provided by at least two hydraulic fluid pumps that each have at least one pressure output, preferably at least one separately controllable pressure output.

It is further advantageous here if the first valve block input is connected to a pressure output of the first hydraulic fluid pump and if the second valve block input is connected to a pressure output of the second hydraulic fluid pump.

One of the plurality of hydraulic fluid pumps can thus, for example, fail without a total failure of the supplied hydraulic fluid to the steering occurring. The hydraulic fluid pump that has not failed is furthermore able to deliver the pressurized fluid for the actuation of the steering.

Provision is preferably made that each of the at least two hydraulic fluid pumps have their own control unit that is preferably respectively connected to different voltage supplies.

In addition to the redundant design of the two control units, at least one of the two hydraulic fluid pumps can thus also continue to be operated on a voltage failure of one of the two voltage supplies.

Provision can further be made in this respect that the separate control units of the at least two hydraulic fluid pumps are connected to one another in order, on a defect event of that pressure source that is connected to the second valve block input and that represents the fixed and non-switchable fluid connection to the steering, to switch the valve independently of other control demands to the first valve block output to continue to ensure a fluid supply for the steering.

If therefore that pressure source fails that is fixedly connected to the steering, that is does not have a switch or the like in its fluid path from the pressure source to the steering, the switching valve is switched such that the other pressure sources whose fluid can be conducted to the steering or to another valve block output in dependence on the switch position is guided to the steering. The failure of the pressure source fixedly linked to the steering is thus at least partially compensated.

Provision can be made in accordance with a further optional further development of the invention that a sensor is present at every pressure output of an associated hydraulic fluid pump to determine the pressure that is applied there, said sensor being connected to the associated control unit of the at least two hydraulic fluid pumps so that they are able to detect an error event in dependence on the pressure applied there.

Provision can furthermore be made in accordance with the invention that a sensor for detecting the load pressure is connected downstream of the first valve block output, preferably directly before a steering cylinder, which sensor is connected to the control units of the at least two hydraulic fluid pumps to preferably enable the steering to work in a pressure regulation mode.

In this respect, two sensors for the respective sensing of the load pressure that are independent of one another can now preferably be arranged downstream of the first valve block output and are each connected to the control units of the at least two hydraulic fluid pumps, with the two sensors that are independent of one another preferably having different designs and/or different measurement ranges.

A redundancy is created by the design of the two sensors that reduces a likelihood of failure of a pressure measurement at this point. It is advantageous in this process if the sensor are not of the same design and/or cover different pressure value ranges.

Provision can be made in accordance with an optional modification of the invention that the control units are adapted to provide a constant pressure to the steering in the event of a failure. This constant pressure can, for example, be in the middle of the normal working range of the steering pressure. The result here would admittedly be a less sensitive steering, but this would be of no importance with respect to functional safety.

Provision can further be made in accordance with an advantageous modification of the invention that a check valve is provided at each pressure output of the at least two hydraulic pumps and that the control units are adapted to monitor the functionality of the sensors at the pressure output in that the value of the sensor is used for the sensing of the steering supply pressure, preferably by means of a check, according to which the pump outputs connected to the steering can never display higher values than the higher ranking pressure sensor.

If it is assumed that the pressure sources connected to the steering generate a pressure that Is never above the higher ranking steering supply pressure, defective pressure sensors at the pressure outputs of a respective hydraulic fluid pump can be recognized via this information. The check valves here ensure that there is no unwanted outflow of hydraulic fluid from the switching valve block, but that it can only exit the block via the valve block outputs.

Provision can furthermore also be made that a check valve is provided at every pressure output of the at least two hydraulic pumps and, if one of the control units detects a failure of a sensor at the pressure output, a control of the pressure source connected to the failed sensor is continued while using the sensor to sense the steering supply pressure.

Provision can be made in accordance with a further modification of the invention that the sensor for sensing the steering supply pressure is arranged directly after the valve block output.

Provision can further be made that the second valve block output is connected to working hydraulics, for example to a tilt cylinder or to a lifting cylinder.

The invention additionally relates to a work machine, in particular to a wheeled loader, having a hydraulic system in accordance with one of the preceding variants.

Although a valve block input and a valve block output are consistently spoken of, it is clear to the skilled person that a direct connection, for example from the pressure source P1, while bypassing a physically formed switching valve block to a hydraulic consumer is likewise covered by the protective scope of the present invention. The switching block and also the valve block input and output are structures that are to be defined in the abstract so that a direct connection of a pressure source to a hydraulic consumer, in particular to a steering control, also falls within the protective scope of the present invention. The direct switching through via a (physical) switching valve block does not necessary have to take place. It is important for the invention that the hydraulic consumer is linked to a direct connection of a pressure source so that fluid flowing out thereof is directly available. A, for example, direct tube connection of a pressure source to a hydraulic consumer, in particular to the steering, is covered by the protective scope of the invention here.

BRIEF DESCRIPTION OF THE DRAWINGS

Further features, details and advantages of the invention will be explained with reference to the following description of the Figures. There are shown.

DESCRIPTION OF THE PREFERRED EMBODIMENTS

Figure 1:
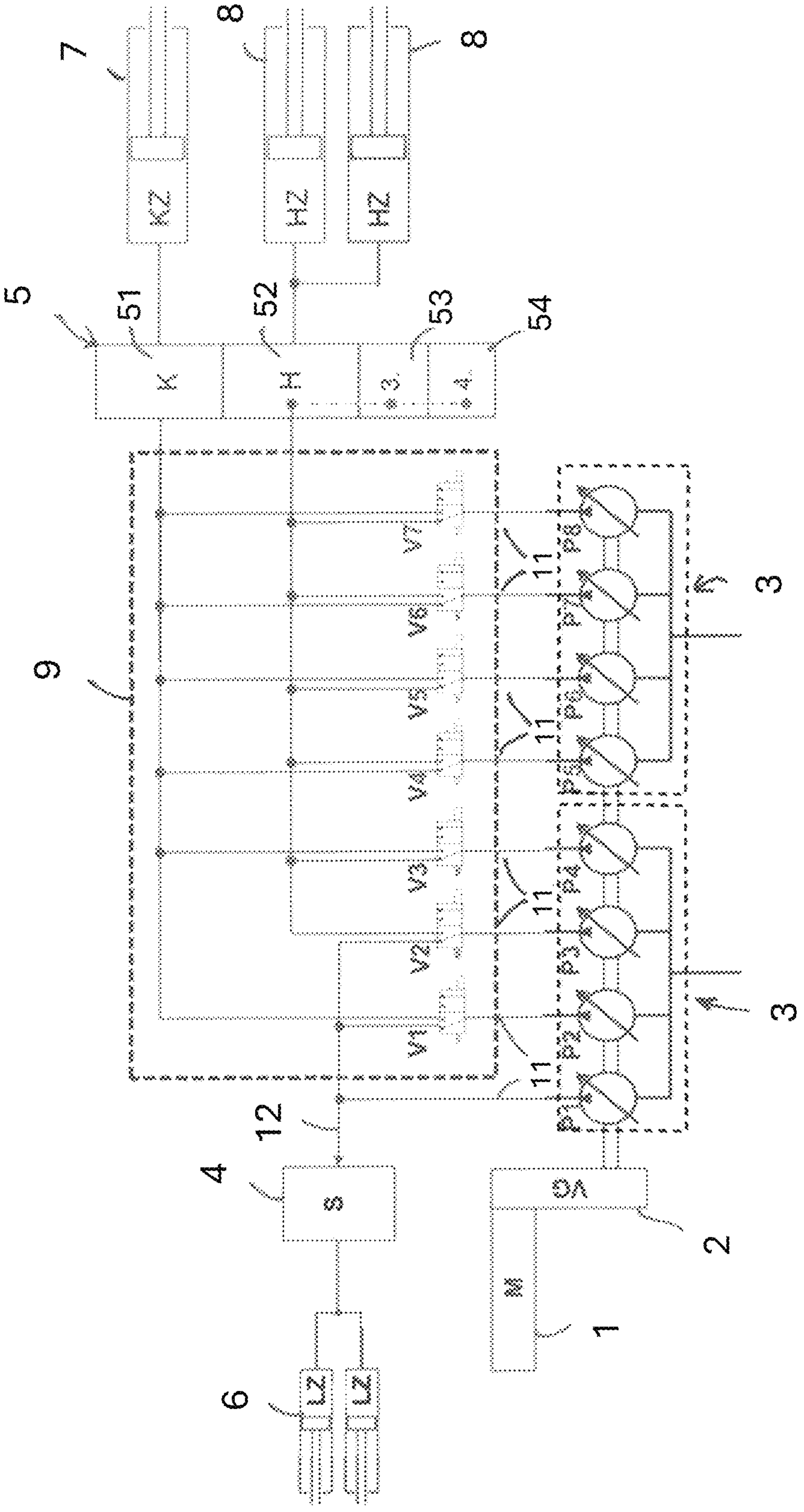
FIG. 1: a schematic representation of a hydraulic system.

FIG. 1 shows a schematic representation of a hydraulic system. A motor 1 can be recognized that drives two pumps 3 via a transfer case 2. One of the two pumps 3 here has a pressure source P1 that is directly connected to a steering control 4 so that the fluid pressure or fluid amount provided by the pressure source P1 serves the actuation of the steering cylinder 6.

In the present case, there is a total of eight pressure source P1-P8 operable independently of one another and implemented by two pumps 3, 3 arranged in tandem operation, of which each one has a plurality (four in the present case) of separately controllable pressure fluid outputs. Each of the total of eight pressure fluid outputs is here connected to its own, associated valve block input 11 that is either directly linked to a valve block output 12 or is guided to a valve V1-V7 (=also switching valve).

In the present Figure, all the pressure fluid outputs P1-P8 of the pumps 3, 3 except for one are connected to a switching valve 10. Only the pressure fluid output P1 is directly connected to a valve block output 12 that is guided to the steering control 4 without a switch. In other words, it is thus ensured that the steering control 4 has the pump capacity of the pressure source P1 permanently and independently of a switch position of the switching valves V1-V7 in the switching valve block 9. If a pump capacity going beyond this is required by the steering control, the switching valves V1 and V2 can be switched such that their associated pressure sources P2, P3 likewise provide their power to the steering control 4. Three pump sources P1, P2, P3 are thus available overall as required to exercise the steering control 4 and to move the steering cylinders 6.

The control valve block 5 in which the hydraulic consumers tilting 51 and lifting 52, as well as further consumers 53, 54 not mentioned by name, are arranged are arranged beside the switching valve block 9 on the right side of FIG. 1. With a corresponding valve setting of the switching valves V1 to V7 in the switching valve block 9, the tilt control 51 can be linked to the pressure sources P2 and P4 to P8 so that sufficient power is present for the tilt function for the actuation of the tilt cylinders 7.

The situation is similar with the lifting control 52 that is likewise connectable to the associated pressure sources P3 to P8 with a corresponding position of the valves V2 to V7. The lifting control 52 can here also forward pump capacity to the further consumers 53, 54 that are not shown in detail for reasons of a simplified illustration.

The pump capacity of the plurality of pressure sources can accordingly also be guided to a respective consumer 6, 7, 8 by this hydraulic system in dependence on a current demand, with the disadvantages of a poor response behavior typically accompanying this being alleviated in that particularly sensitive consumers, for example the steering, are permanently and exclusively connected to a pressure source (the pressure source P1 here).

Figure 2:
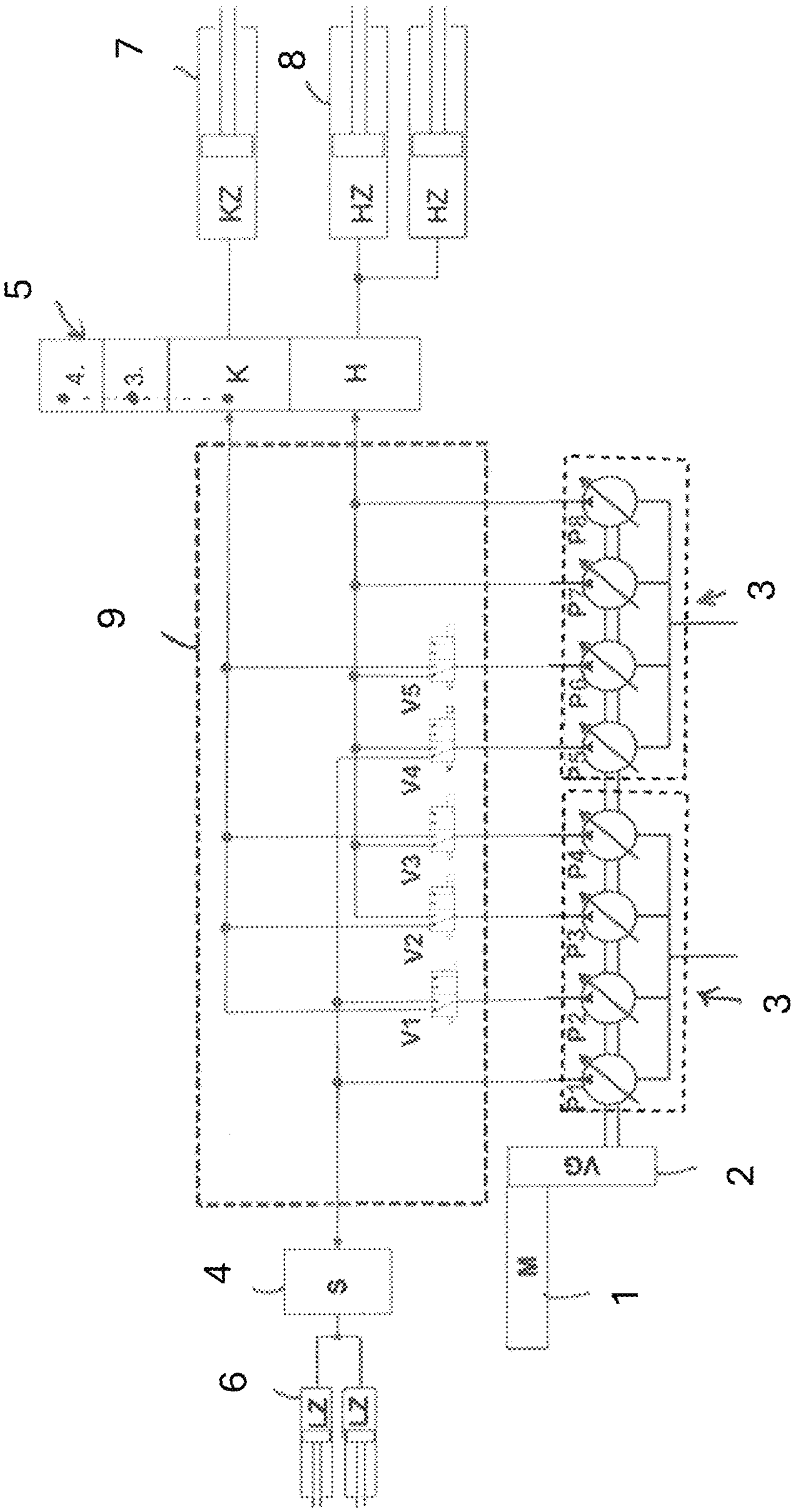
FIG. 2: a schematic representation of a hydraulic system in accordance with the invention.

FIG. 2 shows an implementation of the present invention in which not only the steering control 4 has an exclusive pump capacity, but also the lifting control 52. In this respect, the pumps P7 and P8 are exclusively and unchangeably associated with the hydraulic consumer “lifting” to actuate the lifting cylinders 8. In a similar manner as in FIG. 1, is it also possible to add four further pressure sources P3 to P6 via a corresponding switching of the valves V3 to V5 so that challenging lifting work can also be accomplished.

The tilt control 51 can be connected to a total of four pressure sources P2 to P4 and P6 with a corresponding valve position of the valves V1-V3 and V5. It is likewise possible that the further consumers 53 and 54 are supplied via the tilt control 51 (and not, as shown in FIG. 2, via the lifting control 52).

The added value in accordance with the invention becomes clear in FIG. 2 in that the two pumps 3, 3 that are in tandem operation can now each switch one of their pressure outputs P1, P5 to the steering control 4. The circumstance that the pumps 3, 3 run in tandem operation is of subordinate significance for the invention since a separate operation of the pumps is likewise conceivable and does not stand in the way of the basic idea of the invention.

The pressure output P1 of the left pump 3 is already fixedly connected to the steering control 4 so that the fluid flowing out of the pressure output P1 is completely provided to the steering control.

There is furthermore the possibility via the valve V4 to allow a further pressure source P5 of the other hydraulic fluid pump 3 (the right pump 3 in FIG. 2) to be assigned to the steering control 4.

If, for example, the pressure outputs P1 or P2 can no longer deliver sufficient hydraulic fluid due to a pump defect or can only provide hydraulic fluid at very low pressure, it can be ensured via a switching of the valve V4 that the steering control continues to be sufficiently supplied with hydraulic fluid.

The amounts and the pressure of the hydraulic fluid that is provided via the pressure output P2 are at least sufficient for an emergency steering capability. In such a state, the usual steering comfort is admittedly not provided, but a safe steering and the maintenance of the maneuverability are ensured.

As a result, a more defect-tolerant steering is provided that continues to work reliably even on a failure of one of the two pumps 3, 3 shown.

Figure 3:
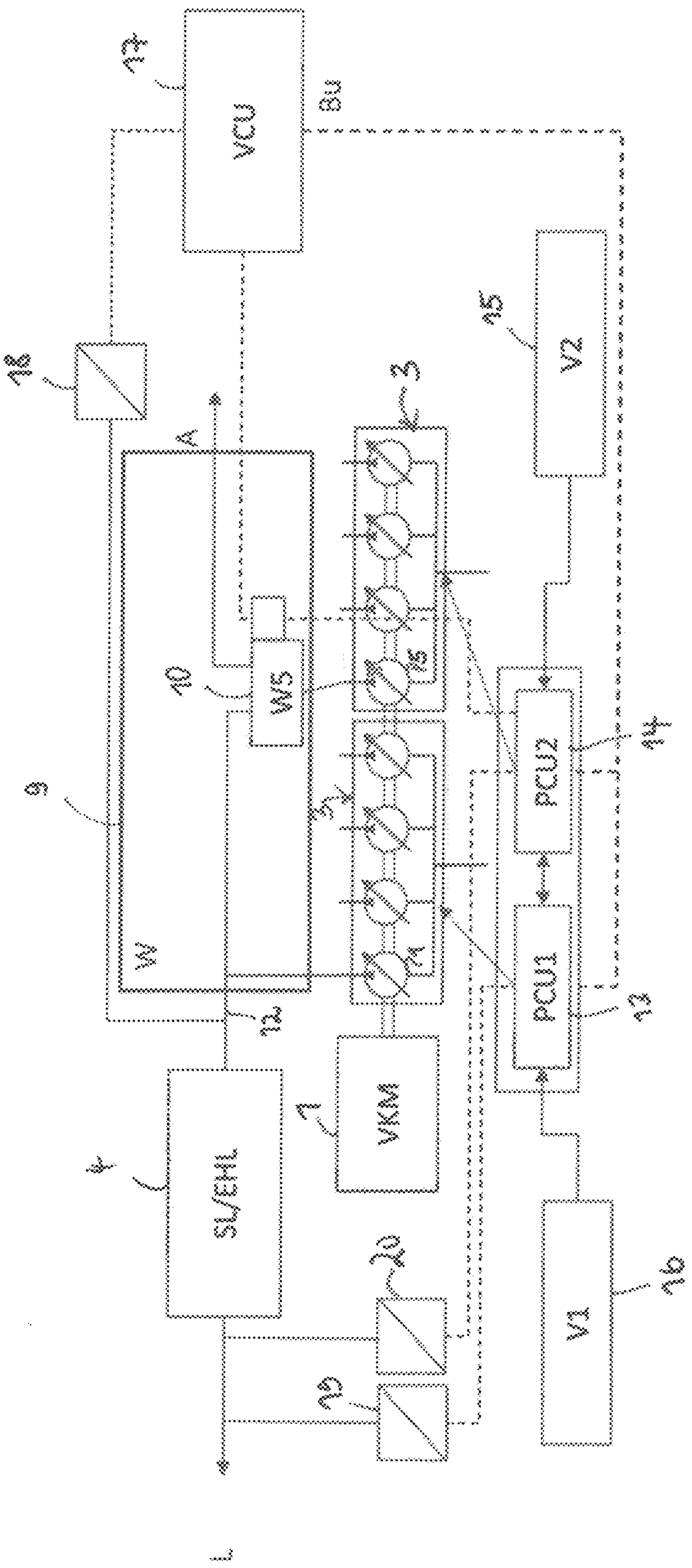
FIG. 3: a schematic representation of a further embodiment of the hydraulic system in accordance with the invention in an abstract form.

FIG. 3 shows a further abstract representation of the present invention. The switching block 9 is now shown in simplified form and now no longer shows the complete wiring of the pressure outputs of the pumps 3, 3, but only those of the pressure outputs P1 and P5. The pressure output of the pressure source P1 is here fixedly and unchangeably connected to the steering control 4. The pressure output of the pressure source P5 runs to a switching valve 10 that selectively connects the pressure output P5 to the working hydraulics A (not shown) or to the steering control 4.

It can additionally be recognized that each of the two hydraulic fluid pumps 3, 3 have their own control units 13, 14 that are connected to one another.

The two control units 13, 14 are furthermore supplied with energy via different supply voltages 15, 16 so that at least one of the two pumps 3, 3 is still controllable on a failure of one of the two supply voltages 15, 16.

Furthermore, after the steering control 4, that is directly before the steering cylinders, not shown, two pressure sensors 19, 20 are present that provide a redundant measurement of the pressure applied there. Differing from the illustration, the pressure measured there by each of the sensors 19, 20 is provided to the two control units 13, 14.

In addition, a further pressure sensor 18, that measures the pressure entering into the steering control, is arranged directly after the switching block. This measured pressure is forwarded over a data line to the two control units 13, 14, with this being able to take place via an optional vehicle control.

It can thus be calculated in one or both of the control units 13, 14 whether the pressure present at the valve block output 12 coincides with the individual pressure values of the possible plurality of pressure sources P1 and P5 switched to the steering control.

In addition, this value can be used if a pressure measurement of a pressure source P1 or P5 were to fail.

The invention claimed is:

1. A hydraulic system for a hydraulically actuable work machine comprising a switching valve block having
   - a plurality of valve block inputs for a respective connection to a pressure output of one or more hydraulic fluid pumps;
   - a plurality of valve block outputs for outputting a pressurized hydraulic fluid;
   - at least one valve arranged between valve block inputs and valve block outputs and adapted to selectively produce a fluid connection between a first valve block input and a first valve block output or between the first valve block input and a second valve block output;
   - a plurality of pressure sources, of which each one is connected to a respective valve block input; and
   - a plurality of hydraulic consumers of which each one is connected to a respective valve block output, wherein
   - the first valve block output has a fixed fluid connection to a second valve block input;
   - steering is connected to the first valve block output; and
   - the fixed fluid connection exclusively connects the first valve block output and the second valve block input.

2. A hydraulic system in accordance with claim 1, wherein the at least one valve is a switching valve that exclusively connects one valve block input to one of the plurality of valve block outputs.

3. A hydraulic system in accordance with claim 1, wherein the plurality of pressure sources are provided by at least two hydraulic fluid pumps that each have at least one pressure output.

4. A hydraulic system in accordance with claim 3, wherein the first valve block input is connected to a pressure output of the first hydraulic fluid pump and the second valve block input is connected to a pressure output of the second hydraulic fluid pump.

5. A hydraulic system in accordance with claim 3, wherein each of the at least two hydraulic fluid pumps have their own control unit.

6. A hydraulic system in accordance with claim 5, wherein a sensor is present at every pressure output of an associated hydraulic fluid pump to determine the pressure that is applied, said sensor being connected to the associated control unit of the at least two hydraulic fluid pumps so that they are able to detect an error event in dependence on the pressure applied.

7. A hydraulic system in accordance with claim 3, wherein the pressure outputs are separately controllable from one another.

8. A hydraulic system in accordance with claim 1, wherein the second valve block output is connected to working hydraulics.

9. A hydraulic system in accordance with claim 8, wherein the second valve block output is connected to a tilt cylinder or to a lifting cylinder.

10. A hydraulic system in accordance with claim 1, wherein the pressure sources are separately controllable from one another.

11. A hydraulic system for a hydraulically actuable work machine comprising a switching valve block having a plurality of valve block inputs for a respective connection to a pressure output of one or more hydraulic fluid pumps;

a plurality of valve block outputs for outputting a pressurized hydraulic fluid;

at least one valve arranged between valve block inputs and valve block outputs and adapted to selectively produce a fluid connection between a first valve block input and a first valve block output or between the first valve block input and a second valve block output;

a plurality of pressure sources, of which each one is connected to a respective valve block input; and a plurality of hydraulic consumers of which each one is connected to a respective valve block output, wherein the first valve block output has a fixed fluid connection to a second valve block input;

steering is connected to the first valve block output;

the plurality of pressure sources are provided by at least two hydraulic fluid pumps that each have at least one pressure output;

each of the at least two hydraulic fluid pumps have their own control unit; and the separate control units of the at least two hydraulic fluid pumps are connected to one another to, on a defect event of the pressure source connected to the second valve block input and represents the fixed and non-switchable fluid connection to the steering, switch the valve independently of other control demands to the first valve block output to continue to ensure a fluid supply for the steering.

12. A hydraulic system in accordance with claim 11, wherein the control units are adapted to provide a constant pressure to the steering in event of a failure.

13. A hydraulic system for a hydraulically actuable work machine comprising a switching valve block having a plurality of valve block inputs for a respective connection to a pressure output of one or more hydraulic fluid pumps;

a plurality of valve block outputs for outputting a pressurized hydraulic fluid;

at least one valve arranged between valve block inputs and valve block outputs and adapted to selectively produce a fluid connection between a first valve block input and a first valve block output or between the first valve block input and a second valve block output;

a plurality of pressure sources, of which each one is connected to a respective valve block input; and a plurality of hydraulic consumers of which each one is connected to a respective valve block output, wherein the first valve block output has a fixed fluid connection to a second valve block input;

steering is connected to the first valve block output;

the plurality of pressure sources are provided by at least two hydraulic fluid pumps that each have at least one pressure output;

each of the at least two hydraulic fluid pumps have their own control unit; and a sensor for sensing the load pressure is connected downstream of the first valve block output, which sensor is connected to the control units of the at least two hydraulic fluid pumps.

14. A hydraulic system in accordance with claim 13, wherein two sensors for the respective sensing of the load pressure that are independent of one another are arranged downstream of the first valve block output and are each connected to the control units of the at least two hydraulic fluid pumps.

15. A hydraulic system in accordance with claim 14, wherein the two sensors that are independent of one another have different designs and/or different measurement ranges.

16. A hydraulic system in accordance with claim 13, wherein the sensor is connected directly before a steering cylinder to enable the steering to work in a pressure regulation mode.

17. A hydraulic system for a hydraulically actuable work machine comprising a switching valve block having a plurality of valve block inputs for a respective connection to a pressure output of one or more hydraulic fluid pumps;

a plurality of valve block outputs for outputting a pressurized hydraulic fluid;

at least one valve arranged between valve block inputs and valve block outputs and adapted to selectively produce a fluid connection between a first valve block input and a first valve block output or between the first valve block input and a second valve block output;

a plurality of pressure sources, of which each one is connected to a respective valve block input; and a plurality of hydraulic consumers of which each one is connected to a respective valve block output, wherein the first valve block output has a fixed fluid connection to a second valve block input;

steering is connected to the first valve block output;

the plurality of pressure sources are provided by at least two hydraulic fluid pumps that each have at least one pressure output;

each of the at least two hydraulic fluid pumps have their own control unit;

a sensor is present at every pressure output of an associated hydraulic fluid pump to determine the pressure that is applied, said sensor being connected to the associated control unit of the at least two hydraulic fluid pumps so that they are able to detect an error event in dependence on the pressure applied;

a check valve is provided at each pressure output of the at least two hydraulic pumps; and the control units are adapted to monitor functionality of the sensors at the pressure output in that a value of the sensor is used for the sensing of the steering supply pressure.

18. A hydraulic system in accordance with claim 17, wherein the sensor for sensing the steering supply pressure is arranged directly after the valve block output.

19. A hydraulic system in accordance with claim 17, wherein pressures measured by a check at connected pump outputs cannot be higher than a higher ranking steering pressure.

20. A hydraulic system for a hydraulically actuable work machine comprising a switching valve block having a plurality of valve block inputs for a respective connection to a pressure output of one or more hydraulic fluid pumps;

a plurality of valve block outputs for outputting a pressurized hydraulic fluid;

at least one valve arranged between valve block inputs and valve block outputs and adapted to selectively produce a fluid connection between a first valve block input and a first valve block output or between the first valve block input and a second valve block output;

a plurality of pressure sources, of which each one is connected to a respective valve block input; and a plurality of hydraulic consumers of which each one is connected to a respective valve block output, wherein the first valve block output has a fixed fluid connection to a second valve block input;

steering is connected to the first valve block output;

the plurality of pressure sources are provided by at least two hydraulic fluid pumps that each have at least one pressure output;

each of the at least two hydraulic fluid pumps have their own control unit;

a sensor is present at every pressure output of an associated hydraulic fluid pump to determine the pressure that is applied, said sensor being connected to the associated control unit of the at least two hydraulic fluid pumps so that they are able to detect an error event in dependence on the pressure applied;

a sensor for sensing the load pressure is connected downstream of the first valve block output, which sensor is connected to the control units of the at least two hydraulic fluid pumps;

a check valve is provided at each pressure output of the at least two hydraulic pumps; and if one of the control units detects a failure of a sensor at the pressure output, a control of the pressure source linked to the failed sensor is continued while using the sensor for sensing the steering supply pressure.

21. A hydraulic system in accordance with claim 20, wherein the sensor downstream of the first valve block output is connected directly before a steering cylinder to enable the steering to work in a pressure regulation mode, with the pressure value at the pump output corresponding to a higher ranking steering pressure.

22. A hydraulic system for a hydraulically actuable work machine comprising a switching valve block having a plurality of valve block inputs for a respective connection to a pressure output of one or more hydraulic fluid pumps;

a plurality of valve block outputs for outputting a pressurized hydraulic fluid;

at least one valve arranged between valve block inputs and valve block outputs and adapted to selectively produce a fluid connection between a first valve block input and a first valve block output or between the first valve block input and a second valve block output;

a plurality of pressure sources, of which each one is connected to a respective valve block input; and a plurality of hydraulic consumers of which each one is connected to a respective valve block output, wherein the first valve block output has a fixed fluid connection to a second valve block input;

steering is connected to the first valve block output;

the plurality of pressure sources are provided by at least two hydraulic fluid pumps that each have at least one pressure output;

each of the at least two hydraulic fluid pumps have their own control unit; and the control units are respectively connected to different voltage supplies.

* * * * *